(12) United States Patent
Mattsson et al.

(10) Patent No.: US 12,363,558 B2
(45) Date of Patent: Jul. 15, 2025

(54) ASSOCIATION WITH A NETWORK DATA ANALYTICS FUNCTION

(71) Applicant: Telefonaktiebolaget LM Ericsson (publ), Stockholm (SE)

(72) Inventors: Ulf Mattsson, Kungsbacka (SE); Aldo Bolle, Västra Frölunda (SE); Miguel Angel Garcia Martin, Pozuelo de Alarcon (ES); Stefan Håkansson, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 379 days.

(21) Appl. No.: 17/788,858

(22) PCT Filed: Dec. 9, 2020

(86) PCT No.: PCT/EP2020/085224
§ 371 (c)(1),
(2) Date: Jun. 24, 2022

(87) PCT Pub. No.: WO2021/136634
PCT Pub. Date: Jul. 8, 2021

(65) Prior Publication Data
US 2023/0036465 A1    Feb. 2, 2023

(30) Foreign Application Priority Data

Jan. 2, 2020 (EP) .................................... 20382001

(51) Int. Cl.
*H04W 24/02* (2009.01)
*H04W 8/00* (2009.01)
*H04W 60/04* (2009.01)

(52) U.S. Cl.
CPC .......... *H04W 24/02* (2013.01); *H04W 8/005* (2013.01); *H04W 60/04* (2013.01)

(58) Field of Classification Search
CPC ...... H04W 24/02; H04W 60/04; H04W 8/005
See application file for complete search history.

(56) References Cited

U.S. PATENT DOCUMENTS 10,667,179 B1 * 5/2020 Young ................... H04W 36/06
11,310,731 B1 * 4/2022 Feder ..................... H04W 8/08
(Continued)

FOREIGN PATENT DOCUMENTS

CN         110312279 A    10/2019
EP          3780702 A1     2/2021
(Continued)

OTHER PUBLICATIONS

Priority doc: 10-2019-0126249, date: Oct. 11, 2019, samsung.*
(Continued)

*Primary Examiner* — Parth Patel
(74) *Attorney, Agent, or Firm* — Murphy, Bilak & Homiller, PLLC

(57) ABSTRACT

Methods and apparatus in a network node are provided. In an example, a method in a network node in a network is provided. The method comprises sending, to a network data management function, information identifying an association between a Network Data Analytics Function (NWDAF) and (i) a first network function in the network, and/or (ii) a User Equipment (UE) in the network.

9 Claims, 7 Drawing Sheets

(56) References Cited

U.S. PATENT DOCUMENTS

| | | | | |
|---|---|---|---|---|
| 12,004,254 | B2* | 6/2024 | Ianev | H04L 43/065 |
| 12,089,137 | B2* | 9/2024 | Dao | H04W 28/0226 |
| 2016/0212633 | A1* | 7/2016 | Flanagan | H04W 4/02 |
| 2018/0262924 | A1* | 9/2018 | Dao | H04W 72/535 |
| 2018/0359337 | A1* | 12/2018 | Kodaypak | H04W 72/00 |
| 2019/0215731 | A1* | 7/2019 | Qiao | H04W 24/06 |
| 2019/0222489 | A1* | 7/2019 | Shan | H04M 15/8022 |
| 2019/0274032 | A1* | 9/2019 | Chatterjee | H04L 5/00 |
| 2019/0281494 | A1* | 9/2019 | Chan | H04L 45/851 |
| 2019/0379734 | A1* | 12/2019 | Zavesky | H04L 67/1076 |
| 2020/0112921 | A1* | 4/2020 | Han | H04W 76/27 |
| 2020/0213876 | A1* | 7/2020 | Sun | H04M 15/66 |
| 2020/0228413 | A1* | 7/2020 | Chong | H04W 88/18 |
| 2020/0228420 | A1* | 7/2020 | Dao | H04L 41/142 |
| 2020/0228999 | A1* | 7/2020 | Chong | H04L 41/14 |
| 2020/0288296 | A1* | 9/2020 | Fiorese | G06N 5/046 |
| 2020/0322775 | A1* | 10/2020 | Lee | H04W 8/02 |
| 2020/0358670 | A1* | 11/2020 | Lee | H04L 41/5067 |
| 2020/0359440 | A1* | 11/2020 | Qiao | H04W 76/15 |
| 2021/0014141 | A1* | 1/2021 | Patil | H04W 76/25 |
| 2021/0144629 | A1* | 5/2021 | Wang | H04W 88/14 |
| 2021/0185695 | A1* | 6/2021 | Gupta | H04W 72/543 |
| 2021/0329485 | A1* | 10/2021 | Han | H04W 28/0236 |
| 2022/0039046 | A1* | 2/2022 | Ianev | H04W 24/08 |
| 2022/0046101 | A1* | 2/2022 | Zhang | H04L 67/51 |
| 2022/0070963 | A1* | 3/2022 | Ianev | H04L 43/065 |
| 2022/0201534 | A1* | 6/2022 | Wang | H04W 24/04 |
| 2022/0248287 | A1* | 8/2022 | Chong | H04W 24/02 |
| 2022/0272010 | A1* | 8/2022 | Marquezan | H04L 43/062 |
| 2022/0369145 | A1* | 11/2022 | Park | H04W 8/02 |
| 2023/0036465 | A1* | 2/2023 | Mattsson | H04W 8/005 |

FOREIGN PATENT DOCUMENTS

| | | |
|---|---|---|
| EP | 4026356 A4 | 10/2022 |
| WO | 2019197467 A1 | 10/2019 |

OTHER PUBLICATIONS

Priority doc: 2019110782760, date: Nov. 6, 2019, Tencent.*

"3GPP TS 23.288 V16.2.0", 3rd Generation Partnership Project; Technical Specification Group Services and System Aspects; Architecture enhancements for 5G System (5GS) to support network data analytics services (Release 16), Dec. 2019, pp. 1-57.

"3GPP TS 23.502 V16.2.0", 3rd Generation Partnership Project; Technical Specification Group Services and System Aspects; Procedures for the 5G System (5GS); Stage 2 (Release 16), Sep. 2019, pp. 1-525.

"Adding Information for enabling proper triggering of NWDAF Data Collection", 3GPP TSG-SA WG2 Meeting #133, S2-1905536, Reno, Nevada, US, (Revision of S2-1903814), May 13-17, 2019, pp. 1-4.

"Analytics with an associated NWDAF instance", SA WG2 Meeting #S2-129, S2-1811159, Dongguan, P. R. China (revision of S2-18xxxx), Oct. 15-19, 2018, pp. 1-5.

"TS 23.288 Performance Improvement and Supervision of general mode for mIoT Terminals", 3GPP TSG-SA WG2 Meeting #130, S2-1901345, Kochi, India, was S2-1901084/0957/0504, Jan. 21-25, 2019, pp. 1-5.

"3GPP TS 23.501 V16.3.0", 3rd Generation Partnership Project; Technical Specification Group Services and System Aspects; System architecture for the 5G System (5GS); Stage 2 (Release 16), Dec. 2019, pp. 1-417.

"3GPP TR 23.791 V1.2.0", 3rd Generation Partnership Project; Technical Specification Group Services and System Aspects; Study of Enablers for Network Automation for 5G (Release 16), Nov. 2018, pp. 1-121.

* cited by examiner

100

200

300

400

ASSOCIATION WITH A NETWORK DATA ANALYTICS FUNCTION

TECHNICAL FIELD

Examples of the present disclosure relate to an association with a Network Data Analytics Function (NWDAF). For example, the association may be between a NWDAF and a User Equipment (UE) or network function (N F).

BACKGROUND

The 3GPP analytics architecture is described in 3GPP TS 23.288, Architecture Enhancements for 5G System (5GS) to support network data analytic services, which is incorporated herein by reference. In 3GPP Rel-16 there are various use cases utilizing analytics with certain Analytics ID(s), which identify type(s) of analytics. There may also be multiple NWDAFs in a network. That is, as indicated in the above-mentioned document:

A single instance or multiple instances of NWDAF may be deployed in a PLMN. In case multiple NWDAF instances are deployed, the architecture supports deploying the NWDAF as a central NF, as a collection of distributed NFs, or as a combination of both.
  NOTE 1: When multiple NWDAFs exist, not all of them need to be able to provide the same type of analytics results, i.e., some of them can be specialized in providing certain types of analytics. An Analytics ID information element is used to identify the type of supported analytics that NWDAF can generate.
  NOTE 2: NWDAF instance(s) can be collocated with a 5GS NF.

Also, as indicated in the above-mentioned document:

In order to support NFs that are consumers of analytics with the discovery of a NWDAF instance that is able to provide some specific type of analytics, each NWDAF instance should provide the list of Analytics ID(s) that it supports when registering to the NRF, in addition to other NRF registration elements of the NF profile. Other NFs requiring the discovery of an NWDAF instance that provides support for some specific type of analytics may query the NRF and include the Analytics ID(s) that identifies the desired type of analytics for that purpose.

Typically, a NWDAF can produce analytic reports for all the UEs deployed in the network (or network slice or region thereof) for one or more types of analytics.

SUMMARY

One aspect of the present disclosure provides a method in a network node in a network. The method comprises sending, to a network data management function, information identifying an association between a Network Data Analytics Function (NWDAF) and (i) a first network function in the network, and/or (ii) a User Equipment (UE) in the network.

Another aspect of the present disclosure provides a method performed by a network node in a network. The method comprises instantiating a Network Data Analytics Function (NWDAF) in the network, wherein the NWDAF is associated with (i) a first network function in the network, and/or (ii) a User Equipment (UE) in the network.

Another aspect of the present disclosure provides a method performed by a network node in a network. The method comprises sending a discovery request to a network data management function, the request identifying a first network function in the network and/or a User Equipment (UE) in the network, and receiving a response from the network data management function, the response comprising information identifying a Network Data Analytics Function (NWDAF) associated with the first network function and/or the UE.

Another aspect of the present disclosure provides a method performed by a network node in a network. The method comprises receiving a registration request to register a Network Data Analytics Function (NWDAF) in the network, the registration request identifying an association between the NWDAF and (i) a first network function in the network, and/or (ii) a User Equipment (UE) in the network, and registering the NWDAF and the association between the NWDAF and the first network function and/or the UE.

Another aspect of the present disclosure provides apparatus in a network node in a network. The apparatus comprises a processor and a memory. The memory contains instructions executable by the processor such that the apparatus is operable to send, to a network data management function, information identifying an association between a Network Data Analytics Function (NWDAF) and (i) a first network function in the network, and/or (ii) a User Equipment (UE) in the network.

Another aspect of the present disclosure provides apparatus in a network node in a network. The apparatus comprises a processor and a memory. The memory contains instructions executable by the processor such that the apparatus is operable to instantiate a Network Data Analytics Function (NWDAF) in the network, wherein the NWDAF is associated with (i) a first network function in the network, and/or (ii) a User Equipment (UE) in the network.

Another aspect of the present disclosure provides apparatus in a network node in a network. The apparatus comprises a processor and a memory. The memory contains instructions executable by the processor such that the apparatus is operable to send a discovery request to a network data management function, the request identifying a first network function in the network and/or a User Equipment (UE) in the network, and receive a response from the network data management function, the response comprising information identifying a Network Data Analytics Function (NWDAF) associated with the first network function and/or the UE.

Another aspect of the present disclosure provides apparatus in a network node in a network. The apparatus comprises a processor and a memory. The memory contains instructions executable by the processor such that the apparatus is operable to receive a registration request to register a Network Data Analytics Function (NWDAF) in the network, the registration request identifying an association between the NWDAF and (i) a first network function in the network, and/or (ii) a User Equipment (UE) in the network, and register the NWDAF and the association between the NWDAF and the first network function and/or the UE.

Another aspect of the present disclosure provides apparatus in a network node in a network. The apparatus is configured to send, to a network data management function, information identifying an association between a Network Data Analytics Function (NWDAF) and (i) a first network function in the network, and/or (ii) a User Equipment (UE) in the network.

Another aspect of the present disclosure provides apparatus in a network node in a network. The apparatus is configured to instantiate a Network Data Analytics Function (NWDAF) in the network, wherein the NWDAF is associated with (i) a first network function in the network, and/or (ii) a User Equipment (UE) in the network.

Another aspect of the present disclosure provides apparatus in a network node in a network. The apparatus is configured to send a discovery request to a network data management function, the request identifying a first network function in the network and/or a User Equipment (UE) in the network, and receive a response from the network data management function, the response comprising information identifying a Network Data Analytics Function (NWDAF) associated with the first network function and/or the UE.

Another aspect of the present disclosure provides apparatus in a network node in a network. The apparatus is configured to receive a registration request to register a Network Data Analytics Function (NWDAF) in the network, the registration request identifying an association between the NWDAF and (i) a first network function in the network, and/or (ii) a User Equipment (UE) in the network, and register the NWDAF and the association between the NWDAF and the first network function and/or the UE.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
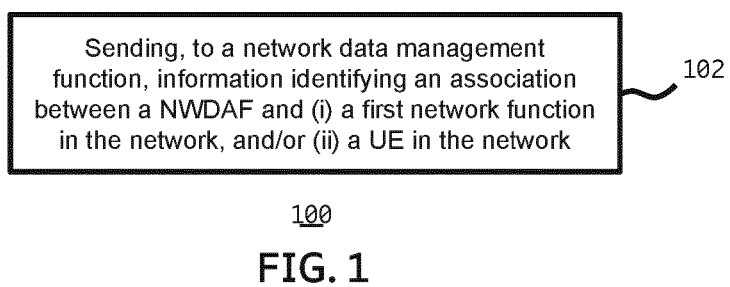
FIG. 1 is a flow chart of an example of a method performed by a network node in a network.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general-purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

Typically, a NWDAF can produce analytic reports for all the UEs deployed in the network (or network slice or region thereof) for one or more types of analytics. This NWDAF is referred to herein as a "central" NWDAF. However, in some cases, it may be beneficial to deploy a specific NWDAF instance to handle analytics data of certain NF instances, or of certain NF types. However, interactions between a central NWDAF or a collection of distributed NFs with the NWDAFs serving different NF types or NF instances are not described or considered in the standard. No mechanism to find which NWDAF instance is serving a specific NF or User Equipment (UE) (potentially for a specific Analytics ID(s)) is specified or considered in the standard. Therefore, a solution to various problems is desired. Firstly, a central NWDAF (or other network function or network node) may need to obtain the knowledge that, for some NFs, an associated NWDAF instance handles the Analytics ID for the subscribers served by the NF. Secondly, central NWDAF (or other network function or network node) may need to discover the address of the NWDAF instance handling the Analytics ID for a specific UE. Thirdly, at UE mobility (e.g. movement of the UE, handover of the UE etc), the AMF (Access and Mobility Management Function) instance serving the UE may change, and the NWDAF instance handling analytics for that UE may also change. Thus, the central NWDAF (or other network function or network node) may need to be informed of the new serving AMF, and whether there is an associated NWDAF handling the analytics data for that UE, or the NWDAF that is now handling analytics for that UE (which may be only for particular Analytics ID(s) in some examples).

Embodiments of this disclosure provide mechanisms for registration and discovery of an association between a NWDAF and a UE and/or NF (the NF may be serving the UE in some examples). For example, consumers of analytics may be able to discover which NWDAF instance serves a specific NF instance or NF type or UE (in some examples for particular analytics ID(s)) by registering information identifying the association, for example by registration in a Network Repository Function (NRF) and/or in a Unified Data Management (UDM).

Embodiments of this disclosure may provide a mechanism enabling a consumer of analytics to find the NWDAF that handles a specific UE (i.e. find an association between a NWDAF and a UE and/or a NF). For example, the NWDAF may hold or generate data for this UE or the NWDAF has been selected to be used for this specific UE. In some examples, the NWDAF may be associated with a UE (or NF) for one or more particular Analytics ID(s). Thus, in some examples there may be multiple NWDAFs associated with a UE or NF, for different analytics ID(s).

Some examples may provide for re-use of analytics in a network where a combination of analytics (for example, analytics relating to different analytics IDs) contributes to fulfil a higher level use case. For example, UE mobility analytics combined with congestion analytics may be used for Background Data Transfer analytics. Some examples may lower signalling in a network compared to only using a centralized NWDAF. Some examples may improve response times when requesting analytics as the NWDAF may be 'closer' (in network terms) to both the NF requesting analytics and to the data sources. In this document, the term "network" may be used, though in some examples this may also comprise a network slice or region thereof (e.g. the network may be a subnet).

FIG. 1 is a flow chart of an example of a method 100 in a network node in a network. The method comprises, in step 102, sending, to a network data management function, information identifying an association between a Network Data Analytics Function (NWDAF) and (i) a first network function (NF) in the network, and/or (ii) a User Equipment (UE) in the network. Thus, for example, an association between a NWDAF and a UE or a NF, or both, may be recorded in the network, for example by the network data management function. The network data management function may be for example a Unified Data Management (UDM) or a Network Repository Function (NRF). The network node performing the method 100 may be for example a NWDAF, such as for example a "local" NWDAF or a NWDAF that is associated with a particular NF, UE and/or analytics ID. Alternatively, the network node may be for example a "central" NWDAF, the first network function, or any other network function or network node.

In some examples, the first network function may comprise an Access and Mobility Management Function (AMF), a Session Management Function (SMF) or another NWDAF. In some examples, the UE is served by the first network function. For example, the UE may be served by the AMF, and hence there may be an association between the NWDAF and the AMF and/or the UE.

In some examples, the information indicates that the NWDAF is for performing analytics only for a subset of UEs in the network. Thus for example the NWDAF may be associated with a flag or other information that may distinguish the NWDAF from another type of NWDAF such as e.g. a "central" NWDAF" that may perform analytics for all UEs in the network and/or for all analytics ID(s). The subset of UEs may include the UE, where the information identifies an association between the NWDAF and the UE.

The information in some examples may also indicate an Analytics ID (or more than one ID) identifying the type(s) of analytics performed by the NWDAF for the UE. The analytics types may be for example those type(s) performed specifically for the UE, or may be type(s) performed by the NWDAF for any UE (e.g. any UE that is served by the first network function).

In some examples, the step of sending is performed in response to a request from the first network function. For example, the request from the first network function is a request for the NWDAF to perform analytics for the UE. Thus, for example the request may prompt the information to be sent to register or record the association between the NWDAF and the UE and/or NF.

In some examples, the first network function is co-located with the NWDAF, e.g. in the same hardware or geographically close hardware. This may in some examples reduce signalling and/or delays or latency between the NWDAF and the first NF.

In some examples, the method comprises receiving a discovery request from another network node or network function (e.g. other than the first network function, such as for example another NWDAF in the network), and sending a response identifying the NWDAF to the another network node or network function. Thus, examples of this disclosure may provide for discovery of the NWDAF. In some examples, the request identifies the UE, and thus for example the response may identify the NWDAF associated with the UE. The request may also identify an Analytics ID (or more than one ID) identifying type(s) of analytics performed by the NWDAF for the UE, and thus for example the response may identify the NWDAF that is performing analytics of those type(s) for the UE. Additionally or alternatively, for example, the request may identify the first network function, and hence the response may identify the NWDAF associated with the first network function. In some examples, sending the response identifying the NWDAF may comprise determining the association between the NWDAF and the first network function and/or UE from a Network Repository Function (NRF).

In some examples, the step of sending may be performed in response to the UE changing its associated network function to the first network function from a preceding network function. This may occur for example due to mobility of the UE.

In some examples, the method 100 may comprise a further step of sending, to the network data management function, information identifying an association between the NWDAF and a further UE in the network. Thus for example information relating to the NWDAF may be updated following e.g. a new association with the further UE, for example due to mobility of the further UE or some other change in the network.

Figure 2:
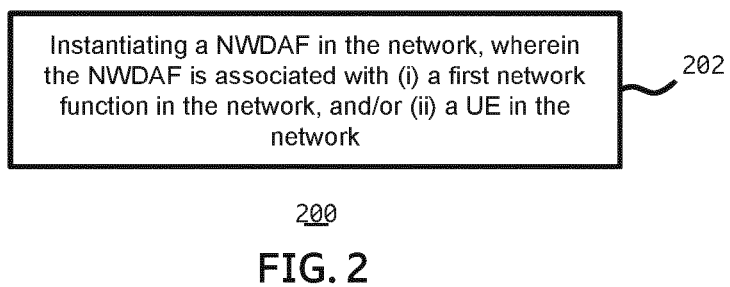
FIG. 2 is a flow chart of an example of a method performed by a network node in a network.

FIG. 2 is a flow chart of an example of a method 200 performed by a network node in a network. The method 200 comprises, in step 202, instantiating a Network Data Analytics Function (NWDAF) in the network, wherein the NWDAF is associated with (i) a first network function in the network, and/or (ii) a User Equipment (UE) in the network. Thus, for example, a NWDAF may be instantiated in a network that has such an association. In some examples, more than one NWDAF may be instantiated, each associated with different UEs, network functions and/or analytics ID(s).

In some examples, the method 200 is performed by the first network function in the network. The first network function may in some examples comprise an Access and Mobility Management Function (AMF), a Session Management Function (SMF) or another NWDAF (e.g. a central NWDAF). In some examples, the UE is served by the first network function.

In some examples, the NWDAF is for performing analytics only for a subset of UEs in the network (which may include the UE, where the association is with the UE). Additionally, the NWDAF is for performing analytics only for predetermined Analytics IDs for the UE. In some examples, the first network function is co-located with the NWDAF.

Figure 3:
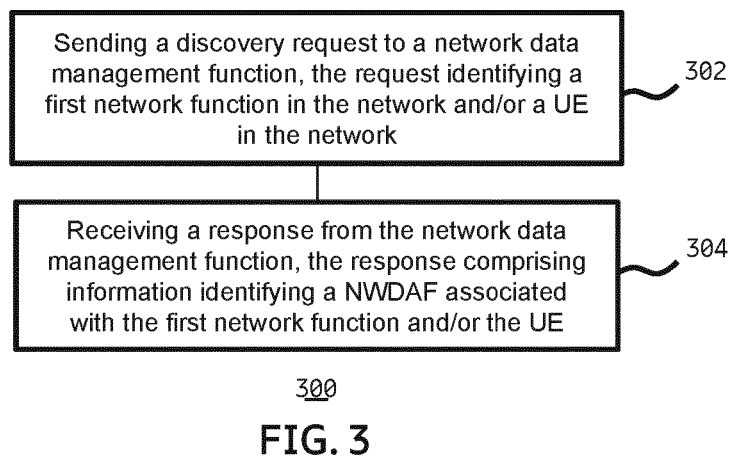
FIG. 3 is a flow chart of an example of a method performed by a network node in a network.

FIG. 3 is a flow chart of an example of a method 300 performed by a network node in a network. The method 300 comprises, in step 302, sending a discovery request to a network data management function, the request identifying a first network function in the network and/or a User Equipment (UE) in the network. The method 300 also comprises, in step 304, receiving a response from the network data management function, the response comprising information identifying a Network Data Analytics Function (NWDAF) associated with the first network function and/or the UE. Thus, for example, a network node may be able to discover the appropriate NWDAF that performs analytics for the UE or for the first network function (e.g. for UEs that are served by the first network function). In some examples, the method 300 is performed by the first network function in the network.

The first network function may in some examples comprise an Access and Mobility Management Function (AMF), a Session Management Function (SMF) or another NWDAF. In some examples, the network data management function comprises a Unified Data Management (UDM) or Network Repository Function (NRF).

In some examples, the discovery request identifies an Analytics ID identifying a type of analytics performed by the NWDAF for the UE. Thus, for example, the discovered NWDAF may be based on the particular analytics ID. In some cases, different analytics types may be performed by different NWDAFs (in some cases even for the same UE(s)), and thus, providing information identifying the type of analytics may allow discovery of the correct NWDAF.

In some examples, the first network function is co-located with the NWDAF.

Figure 4:
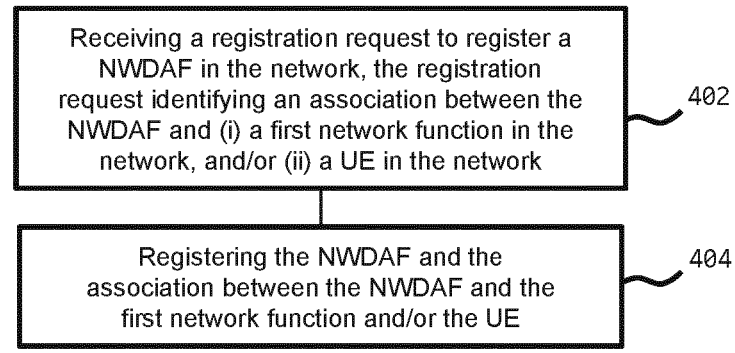
FIG. 4 is a flow chart of an example of a method performed by a network node in a network.

FIG. 4 is a flow chart of an example of a method 400 performed by a network node in a network. The method comprises, in step 402, receiving a registration request to register a Network Data Analytics Function (NWDAF) in the network, the registration request identifying an association between the NWDAF and (i) a first network function in the network, and/or (ii) a User Equipment (UE) in the network. The method 400 also comprises, in step 404, registering the NWDAF and the association between the NWDAF and the first network function and/or the UE. Thus for example the node may register the association in the network. In some examples, the network node may be a network data management function, such as for example a Unified Data Management (UDM) or Network Repository Function (NRF).

In some examples, the registration request is received from the NWDAF. Alternatively, the registration request may be received from the first network function in the network, or from another NWDAF in the network, or from any other network function or network node.

Registering the NWDAF and the association may in some examples comprise registering the NWDAF and the association in a Network Repository Function (NRF). In such cases, the network node performing the method 400 may comprise a node other than a NRF, such as for example a UDM.

In some examples, the first network function comprises an Access and Mobility Management Function (AMF), a Session Management Function (SMF) or another NWDAF. In some examples, the first network function is co-located with the NWDAF.

In some examples, the information indicates an Analytics ID for analytics performed by the NWDAF for the UE. Registering the NWDAF and the association may then comprise registering the Analytics ID for the NWDAF.

The method 400 may in some examples comprise receiving a discovery request from another network node or network function, and sending a response identifying the NWDAF to the another network node or network function. Thus for example the discovery process may be fulfilled. The another network node or network function may comprise another NWDAF in the network, e.g. a central NWDAF.

The method 400 may comprise the further steps of receiving information identifying an association between the NWDAF and a further UE in the network, and registering the association between the NWDAF and the further UE. This may occur e.g. following mobility of the further UE.

Particular example embodiments will now be described. There may be several reasons why an NWDAF is associated to an NF (e.g. an AMF). One reason is that they are is some sense co-located. For example, they may be in the same virtual machine VM or same data center, or geographically close.

In the following examples, embodiments of this disclosure are exemplified in the case of an AMF that has an associated NWDAF. These examples may be applied to other cases where a NWDAF is associated with a different NF and/or one or more particular UEs.

Figure 5:
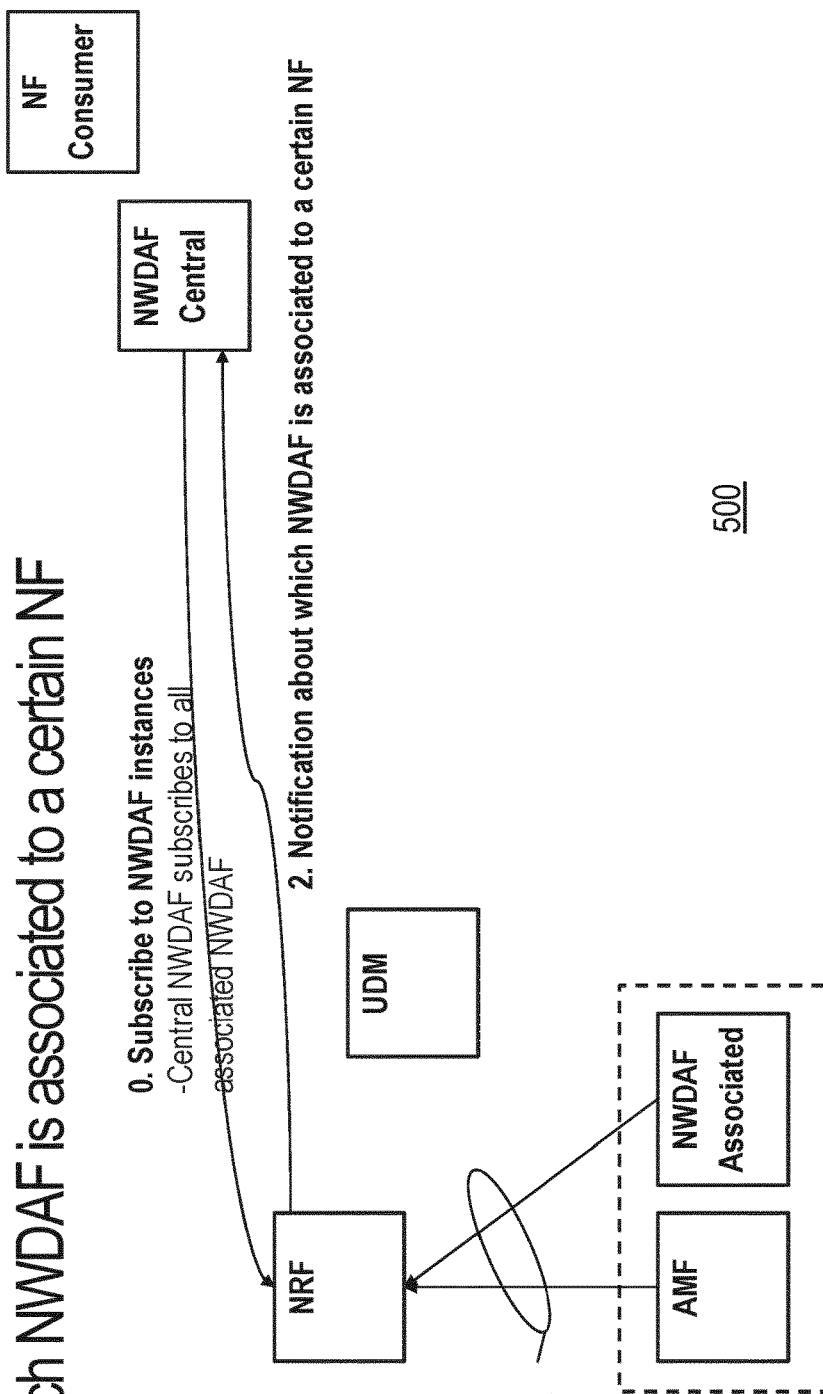
FIG. 5 illustrates an example of how to know which NWDAF is associated with a certain network function.
Figure 6:
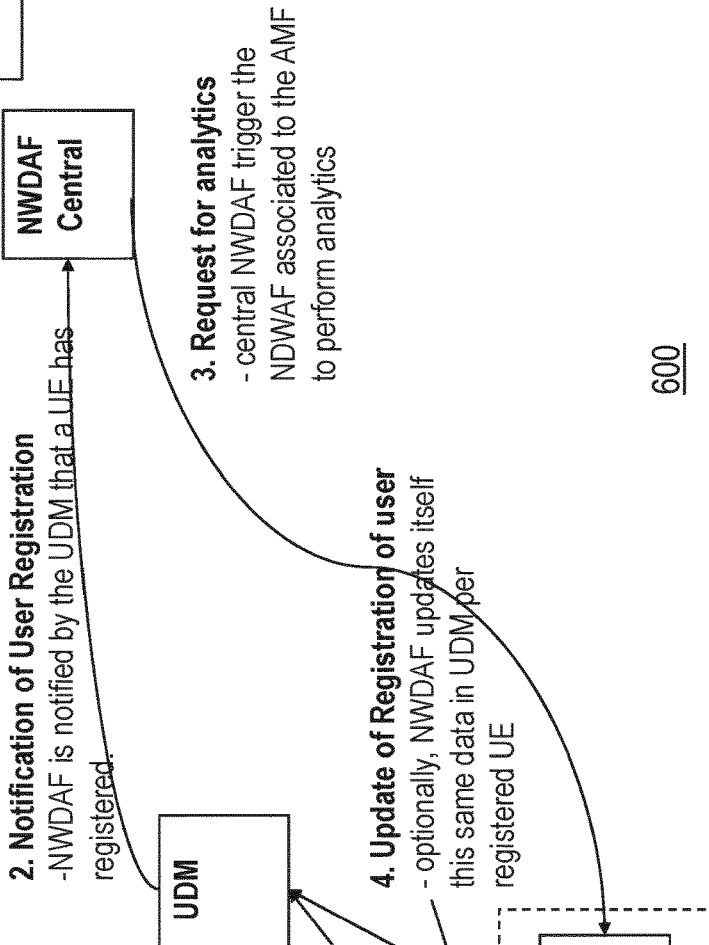
FIG. 6 illustrates an example of how to request analytics from the associated NWDAF for a specific User Equipment.
Figure 6:
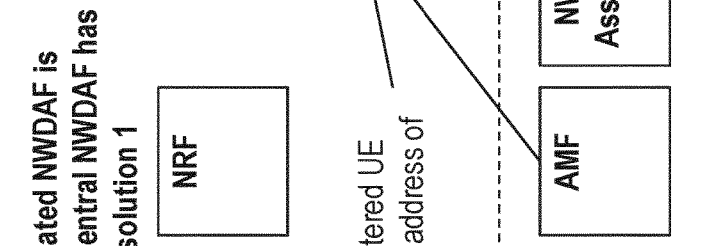

Two alternative solutions are proposed to address the problems identified above. The first solution, illustrated in FIG. 5, leverages on a notification from the NRF to the central NWDAF that an NWDAF associated to an e.g. AMF has been deployed. At a later stage during UE registration, the UDM notifies the central NWDAF that a UE is served by a certain AMF. The central NWDAF can thus request to perform analytics from the NDWAF associated to that AMF, for that specific UE, as illustrated in FIG. 6.

Figure 7:
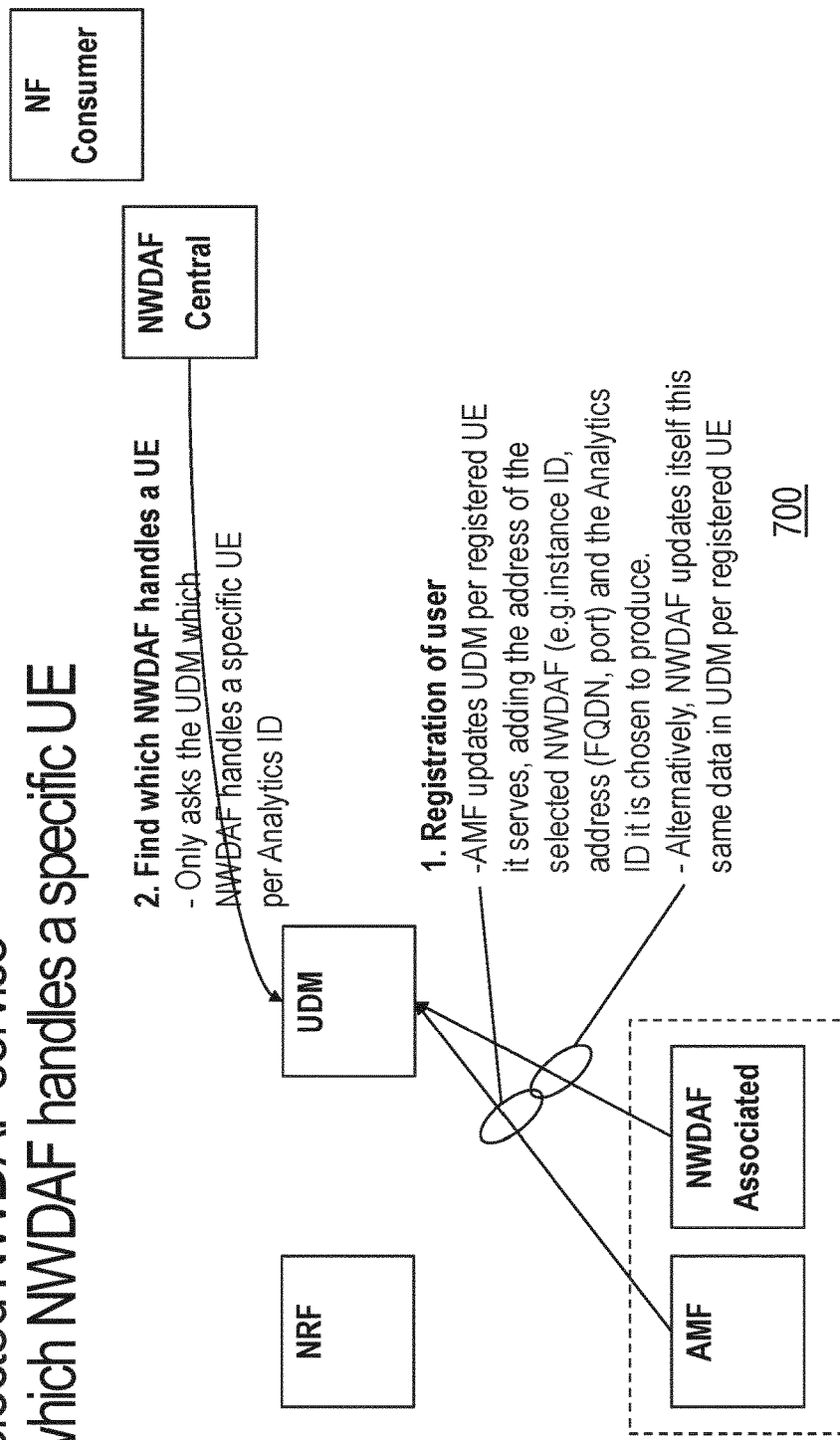
FIG. 7 illustrates an example of how to know which NWDAF handles a specific User Equipment.

The second solution leverages on the AMF or the associated NWDAF to update the UDM with the address of the associated NWDAF (NWDAF instance, FQDN, port, service endpoint) and Analytics ID for that UE, allowing the Central NWDAF to find the associated NWDAF for a specific UE via a query to UDM as illustrated in the steps of FIG. 7.

Figure 8:
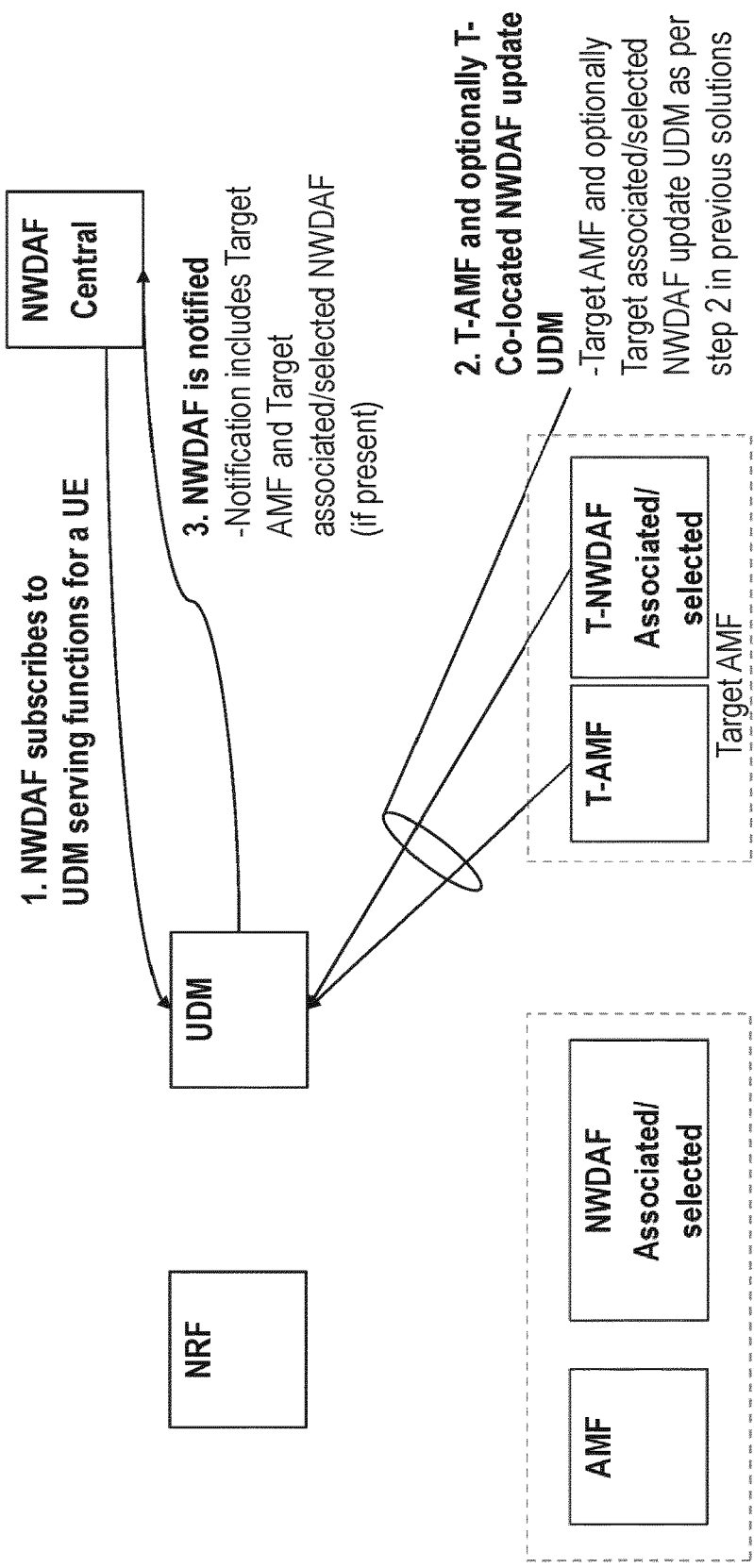
FIG. 8 illustrates an example of mobility to another AMF.

Since at mobility the serving AMF for a UE may change, the Central NDWAF needs to be notified of the change of associated NWDAF. In this case is the target AMF or its associated NWDAF that updates the information in UDM according to the steps in FIG. 8.

Figure 9:
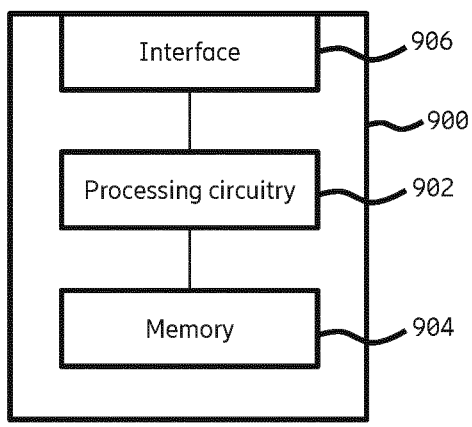
FIG. 9 is a schematic of an example of apparatus in a network node.

FIG. 9 is a schematic of an example of apparatus 900 in a network node. The apparatus 900 comprises processing circuitry 902 (e.g. one or more processors) and a memory 904 in communication with the processing circuitry 902. The memory 904 contains instructions executable by the processing circuitry 902. The apparatus 900 also comprises an interface 906 in communication with the processing circuitry 902. Although the interface 906, processing circuitry 902 and memory 904 are shown connected in series, these may alternatively be interconnected in any other way, for example via a bus.

In one embodiment, the memory 904 contains instructions executable by the processing circuitry 902 such that the apparatus 900 is operable to send, to a network data management function, information identifying an association between a Network Data Analytics Function (NWDAF) and (i) a first network function in the network, and/or (ii) a User Equipment (UE) in the network. In some examples, the apparatus 900 is operable to carry out the method 100 described above, or the method described above with reference to FIG. 1.

Figure 10:
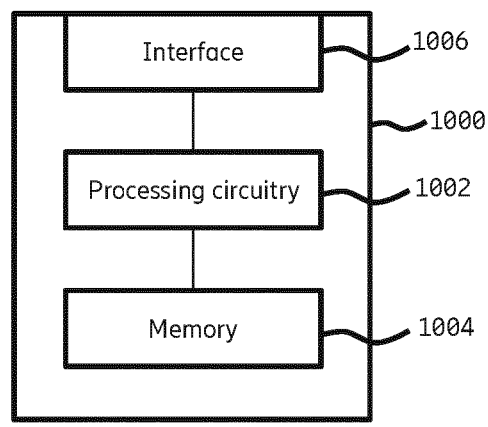
FIG. 10 is a schematic of an example of apparatus in a network node.

FIG. 10 is a schematic of an example of apparatus 1000 in a network node. The apparatus 1000 comprises processing circuitry 1002 (e.g. one or more processors) and a memory 1004 in communication with the processing circuitry 1002. The memory 1004 contains instructions executable by the processing circuitry 1002. The apparatus 1000 also comprises an interface 1006 in communication with the processing circuitry 1002. Although the interface 1006, processing circuitry 1002 and memory 1004 are shown connected in series, these may alternatively be interconnected in any other way, for example via a bus.

In one embodiment, the memory 1004 contains instructions executable by the processing circuitry 1002 such that the apparatus 1000 is operable to instantiate a Network Data Analytics Function (NWDAF) in the network, wherein the NWDAF is associated with (i) a first network function in the network, and/or (ii) a User Equipment (UE) in the network. In some examples, the apparatus 1000 is operable to carry out the method 200 described above, or the method described above with reference to FIG. 2.

Figure 11:
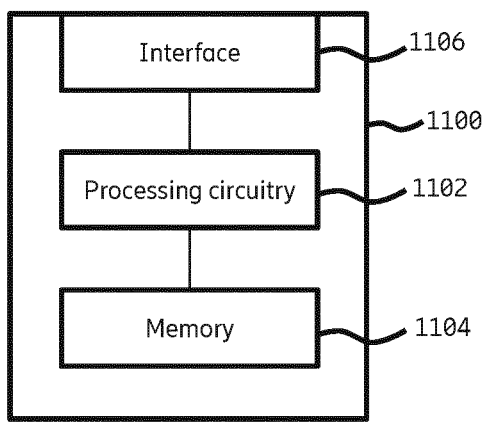
FIG. 11 is a schematic of an example of apparatus in a network node.

FIG. 11 is a schematic of an example of apparatus 1100 in a network node. The apparatus 1100 comprises processing circuitry 1102 (e.g. one or more processors) and a memory 1104 in communication with the processing circuitry 1102. The memory 1104 contains instructions executable by the processing circuitry 1102. The apparatus 1100 also comprises an interface 1106 in communication with the processing circuitry 1102. Although the interface 1106, processing circuitry 1102 and memory 1104 are shown connected in series, these may alternatively be interconnected in any other way, for example via a bus.

In one embodiment, the memory 1104 contains instructions executable by the processing circuitry 1102 such that the apparatus 1100 is operable to send a discovery request to a network data management function, the request identifying a first network function in the network and/or a User Equipment (UE) in the network, and receive a response from the network data management function, the response comprising information identifying a Network Data Analytics Function (NWDAF) associated with the first network function and/or the UE. In some examples, the apparatus 1100 is operable to carry out the method 300 described above, or the method described above with reference to FIG. 3.

Figure 12:
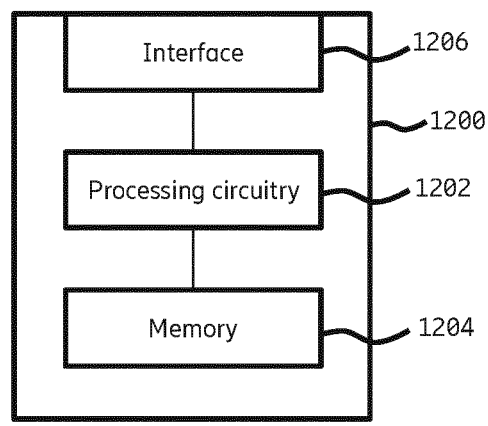
FIG. 12 is a schematic of an example of apparatus in a network node.

FIG. 12 is a schematic of an example of apparatus 1200 in a network node. The apparatus 1200 comprises processing circuitry 1202 (e.g. one or more processors) and a memory 1204 in communication with the processing circuitry 1202. The memory 1204 contains instructions executable by the processing circuitry 1202. The apparatus 1200 also comprises an interface 1206 in communication with the processing circuitry 1202. Although the interface 1206, processing circuitry 1202 and memory 1204 are shown connected in series, these may alternatively be interconnected in any other way, for example via a bus.

In one embodiment, the memory 1204 contains instructions executable by the processing circuitry 1202 such that the apparatus 1200 is operable to send a discovery request to a network data management function, the request identifying a first network function in the network and/or a User Equipment (UE) in the network, and receive a response from the network data management function, the response comprising information identifying a Network Data Analytics Function (NWDAF) associated with the first network function and/or the UE. In some examples, the apparatus 1200 is operable to carry out the method 400 described above, or the method described above with reference to FIG. 4.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method performed by a Network Data Analytics Function (NWDAF) in a network, the method comprising: sending, to a Unified Data Management (UDM) function in the network, a registration request to register the NWDAF, wherein the registration request identifies the following: the NWDAF, an association between the NWDAF and a User Equipment (UE) in the network, and an Analytics ID for analytics performed by the NWDAF for the UE; subsequently receiving, from another NWDAF in the network, a discovery request to discover an NWDAF instance that serves the UE in the network, wherein the discovery request identifies the following: the VE, and a type of analytics performed for the VE by the NWDAF instance that serves the UE; and sending to the other NWDAF a discovery response identifying the NWDAF as the NWDAE instance that serves the UE in the network.

2. The method of claim 1, wherein the registration request also indicates one or more of the following: that the NWDAF is-fer performs analytics only for a subset of UEs in the network, and a type of analytics performed by the NWDAF for the UE.

3. The method of claim 1, wherein sending the discovery response identifying the NWDAF comprises determining the association between the NWDAF and the UE from a Network Repository Function (NRF).

4. The method of claim 1, further comprising sending, to the UDM function, information identifying an association between the NWDAF and a further VE in the network.

5. A method performed by a Unified Data Management (UDM) function in a network, the method comprising: receiving, from a Network Data Analytics Function (NWDAF) in the network, a registration request to register the NWDAF, wherein the registration request identifies the following: the NWDAF, an association between the NWDAF and a User Equipment (UE) in the network, and an Analytics ID for analytics performed by the NWDAF for the UE; and in response to the registration request, registering the NWDAF, the association between the NWDAF and the UE, and the Analytics ID for analytics performed by the NWDAF for the UE; subsequently receiving, from another NWDAF in the network, a discovery request to discover an NWDAF instance that serves the UE in the network, wherein the discovery request identifies the following: the UE, and a type of analytics performed for the UE by the NWDAF instance that serves the UE; and based on the registered association between the NWDAF and the UE, sending to the other NWDAF a discovery response identifying the NWDAF as the NWDAF instance that serves the UE in the network.

6. The method of claim 5, wherein the request indicates that the NWDAF is configured to perform analytics for only a subset of UEs in the network.

7. The method of claim 5, further comprising: receiving information identifying an association between the NWDAF and a further UE in the network, and registering the association between the NWDAF and the further UE.

8. A Network Data Analytics Function (NWDAF) configured for operation in a network, the NWDAF comprising: a processor; and a memory storing instructions executable by the processor, wherein execution of the instructions by the processor configures the NWDAF to perform operations corresponding to the method of claim 1.

9. A Unified Data Management (UDM) function configured for operation in a network, the UDM function comprising: a processor; and a memory storing instructions executable by the processor, wherein execution of the instructions by the processor configures the UDM function to perform operations corresponding to the method of claim 5.

\* \* \* \* \*